Patented May 3, 1927.

1,627,359

UNITED STATES PATENT OFFICE.

HANS TRUTTWIN, OF VIENNA, AUSTRIA.

METAL-IODIDE-ALKALI-IODIDE COMPOUNDS SUITABLE FOR USE IN THERAPEUTICS AND PROCESS FOR MANUFACTURING THEM.

No Drawing. Application filed June 28, 1923, Serial No. 648,349, and in Germany July 3, 1922.

My invention relates to metal-iodide-alkali-iodide compounds suitable for use in therapeutics and to the process of manufacturing them.

The cauterizing action and the property of precipitating albumins of silver preparations for the treatment of gonorrhea were the cause of their being replaced by organic silver preparations. The later proposal to employ solutions of bismuth-iodide-alkali-iodides in place of silver-albumin compounds for obtaining the same therapeutic effects was consequently also based on the idea that such solutions must not precipitate albumin. For this reason in addition to a small amount of acid, alkali iodides were added in such large excess to the bismuth iodide or to its alkali iodide double salts, that the mixed salt solutions produced were prevented from precipitating albumin, gelatine and the like in contradistinction to the bismuth-alkali-iodide solutions used for analytical purposes.

Now I have found that this was a wrong conclusion. In contradistinction to silver preparations, with such solutions, sure and effective therapeutical effects can be attained only under the condition that alkali-iodides are not added in such an excess as would be sufficient to prevent the albumin precipitating action. Based on numerous clinical experiments, the fact has been ascertained that it is just the albumin precipitating solutions of metal-iodide-alkali-iodide compounds that exert quite an extraordinarily efficient action, so that they are suitable not only for the treatment of gonorrhea, but surprisingly also for the treatment of various other pathological processes. The therapeutically effective solutions in question differ from the known bismuth-alkali-iodide solutions used for analytical purposes in the same manner as the previously proposed solutions, in which the excess of alkali iodides prevented the albumin precipitating action, by the feature that separation of bismuth-oxide-iodide does not occur even when the solutions are greatly diluted. This property essential for the employment of the solution in therapeutics can, however, be attained within wide limits without difficulty independently of the excess of alkaline-iodide by selecting the proportions between alkali iodide and acid. The assumption has therefore also been proved to be faulty that the property of the bismuth salts of being precipitated by water from their solutions in the form of their oxide compounds, could only be prevented by the addition of such an excess of alkali iodides in the presence of small amounts of acid, as would prevent the albumin-precipitating action.

The therapeutically effective solutions according to the present invention may be prepared for example as follows:

1. 100 grammes bismuth-iodide-potassium-iodide, (Kahlbaum) and 10 cc. lactic acid (75%) are dissolved in 100 cc. water.

2. 10 grammes bismuth-iodide-potassium-iodide, 10 grammes potassium iodide and 6 cc. lactic acid (75%) are dissolved in 100 cc. water.

3. 20 parts of the iodine double salt, 20 parts of potassium iodide and 2 cc. lactic acid (75%) are dissolved in 100 parts of water.

4. 22.5 parts of the double salt, 5 parts potassium iodide, and 20 parts lactic acid (75%) are dissolved in 100 parts of water.

All these solutions are used in a dilution of 1:10 or more without precipitation of bismuth oxi-iodide occurring.

A comparison of the examples shows that this success is attained by continuously diminishing the excess in alkali-iodides by correspondingly increasing the amount of acid. The proportion of alkali iodides and acids to metal iodide and to each other, which produces the condition that without preventing the albumin precipitating action the separation of bismuth oxi-iodide is prevented, may be easily ascertained in each case by a few test-tube tests.

The solutions of such salt mixtures may be also worked up to ointments of a high therapeutical effect. As an example the following may be given:

5. 300 parts of an ointment base are worked up with 500 parts of bismuth-iodide-potassium-iodide, 5 parts lactic acid, (75%) and 20 parts of water to form an ointment.

I use the term "metal idodide compounds" to include not only the simple metal iodides, but also any metal-iodide-alkali-iodide double salt, for example silver-iodide-potassium-iodide, copper-iodide-potassium-iodide, lead-iodide-potassium-iodide and the like. It is also obvious that instead of metal iodide a salt mixture may be used from which metal iodide in statu nascendi is formed, for example bismuth nitrate and potassium iodide.

If the metal-iodide compound should be acid, (as for instance in the case of zinc-potassium-iodide), this acid reaction has to be taken into account when considering the total amount of acid.

I claim:

1. Process for the production of therapeutically effective solutions of metal-iodide-alkali-iodide compounds by the addition of alkali-iodides to metal-iodide compounds in the presence of acids in such proportions that the amount of alkali-iodides, acids, and metal-iodide compound is such that the corresponding mixed salt solutions although capable of precipitating albumin and the like, are capable of being brought to a high degree of dilution by the addition of water, without separating out insoluble compounds.

2. A process as set forth in claim 1, in which process organic acids are used as acid addition.

3. A process as set forth in claim 1, in which process the acid to be used as an addition consists of lactic acid.

4. Therapeutically effective solutions of metal-iodide-alkali-iodide compounds consisting of a mixture of alkali-iodides, metal-iodide compounds and acids, the proportion of alkali iodides and acids to the metal iodide and to each other being such, that without preventing the albumin precipitating action the separation of insoluble compounds by dilution to a high degree with water is prevented.

5. Therapeutically effective solutions of metal-iodide-alkali-iodide compounds consisting of a mixture of alkali-iodides, metal-iodide compounds and acids, containing alkali-iodide in a smaller amount than would be sufficient to prevent the albumin precipitating action, whilst the proportions between alkali-iodide and acid are chosen in such a manner, that separation of precipitate does not occur, even when the solution is greatly diluted with water.

6. Therapeutically effective solutions of metal-iodide-alkali-iodide compounds consisting of a mixture of alkali-iodides, metal-iodide compounds and organic acids.

7. Therapeutically effective solutions of metal-iodide-alkali-iodide compounds consisting of a mixture of alkali iodides, metal-iodide compounds and lactic acid.

In testimony whereof I have affixed my signature.

HANS TRUTTWIN.